US010572644B2

United States Patent
Gordon

(10) Patent No.: US 10,572,644 B2
(45) Date of Patent: Feb. 25, 2020

(54) INTERACTING WITH A COMPUTING DEVICE VIA IDENTITY-BEARING PERIPHERAL DEVICES

(71) Applicant: Microsoft Technology Licensing, LLC, Redmond, WA (US)

(72) Inventor: John C. Gordon, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 15/417,123

(22) Filed: Jan. 26, 2017

(65) Prior Publication Data

US 2018/0211026 A1  Jul. 26, 2018

(51) Int. Cl.
| | |
|---|---|
| G06F 21/34 | (2013.01) |
| G06F 13/20 | (2006.01) |
| G06F 13/40 | (2006.01) |
| H04L 29/06 | (2006.01) |
| H04L 29/08 | (2006.01) |
| A63F 13/355 | (2014.01) |

(52) U.S. Cl.
CPC .............. *G06F 21/34* (2013.01); *G06F 13/20* (2013.01); *G06F 13/4068* (2013.01); *H04L 63/0853* (2013.01); *A63F 13/355* (2014.09); *G06F 2221/2141* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,754,725 B1 | 6/2004 | Wright et al. | |
| 6,823,451 B1 * | 11/2004 | Gulick | G06F 21/85 |
| | | | 713/153 |
| 7,320,071 B1 * | 1/2008 | Friedman | G06F 21/85 |
| | | | 713/165 |
| 7,323,969 B1 * | 1/2008 | Delgado | G07C 5/008 |
| | | | 340/425.5 |
| 8,407,347 B2 | 3/2013 | Zhang et al. | |
| 8,432,362 B2 | 4/2013 | Cheng et al. | |
| 8,528,059 B1 * | 9/2013 | Labana | H04L 63/08 |
| | | | 705/76 |

(Continued)

OTHER PUBLICATIONS

Clercq; Smart Cards; 2008; Retrieved from the Internet <URL: https://web.archive.org/web/20081224185938/https://technet.microsoft.com/en-us/library/dd277362.aspx>; pp. 1-21, as printed. (Year: 2008).*

(Continued)

*Primary Examiner* — Saleh Najjar
*Assistant Examiner* — Michael W Chao
(74) *Attorney, Agent, or Firm* — Rainier Patents, P.S.

(57) ABSTRACT

A technique is described herein by which a user may gain access to a target resource via one or more particular peripheral devices that have been associated with the user. The technique performs this task by detecting when a user communicatively couples an identity-bearing component to a hub device. The user may thereafter use any input and/or output peripheral device that is also coupled to hub device to interact with the target resource, in a manner specified by authentication information associated with the user. In another use scenario, two or more users may interact with the same target resource via respective collections of user-associated peripheral devices.

21 Claims, 8 Drawing Sheets

(56) References Cited

U.S. PATENT DOCUMENTS

| | | | | |
|---|---|---|---|---|
| 8,891,545 B2* | 11/2014 | Sartori | ............... | G09G 5/12 |
| | | | | 370/419 |
| 10,097,534 B2* | 10/2018 | Vajravel | ............... | H04L 63/083 |
| 10,099,129 B2* | 10/2018 | Dietrich, Jr. | ......... | H04N 21/233 |
| 10,118,095 B2* | 11/2018 | Diard | ............... | G06T 15/005 |
| 10,313,448 B2* | 6/2019 | Vajravel | ............... | H04L 67/141 |
| 2002/0011516 A1* | 1/2002 | Lee | ............... | G06F 3/0227 |
| | | | | 235/380 |
| 2004/0003262 A1* | 1/2004 | England | ............... | G06F 21/606 |
| | | | | 713/189 |
| 2006/0208066 A1* | 9/2006 | Finn | ............... | G06K 7/0004 |
| | | | | 235/380 |
| 2006/0226950 A1* | 10/2006 | Kanou | ............... | G06F 21/10 |
| | | | | 340/5.61 |
| 2007/0083604 A1* | 4/2007 | Zimman | ............... | G06F 21/32 |
| | | | | 709/207 |
| 2007/0168648 A1* | 7/2007 | Mardiks | ............... | B60R 13/0243 |
| | | | | 712/36 |
| 2009/0049307 A1* | 2/2009 | Lin | ............... | G06F 21/72 |
| | | | | 713/185 |
| 2009/0118017 A1* | 5/2009 | Perlman | ............... | H04N 21/2143 |
| | | | | 463/42 |
| 2009/0193511 A1 | 7/2009 | Noe et al. | | |
| 2009/0287856 A1* | 11/2009 | Ito | ............... | G06F 13/10 |
| | | | | 710/19 |
| 2010/0192152 A1* | 7/2010 | Miyamoto | ............... | G06F 9/485 |
| | | | | 718/102 |
| 2010/0262835 A1* | 10/2010 | Joffray | ............... | G06F 21/34 |
| | | | | 713/185 |
| 2011/0179418 A1* | 7/2011 | Takebe | ............... | G06F 9/45558 |
| | | | | 718/1 |
| 2011/0264922 A1* | 10/2011 | Beaumont | ............... | G06F 21/84 |
| | | | | 713/189 |
| 2011/0289596 A1* | 11/2011 | Sebesta | ............... | G06F 3/0622 |
| | | | | 726/28 |
| 2012/0059969 A1* | 3/2012 | Chou | ............... | G06F 13/4022 |
| | | | | 710/316 |
| 2012/0311564 A1* | 12/2012 | Khalid | ............... | G06F 8/61 |
| | | | | 718/1 |
| 2014/0195594 A1* | 7/2014 | Ahuja | ............... | G06F 3/0484 |
| | | | | 709/203 |
| 2016/0011896 A1* | 1/2016 | Khalid | ............... | G06F 9/45558 |
| | | | | 718/1 |
| 2016/0294899 A1* | 10/2016 | Huang | ............... | A63F 13/847 |
| 2016/0321195 A1 | 11/2016 | Ghosh et al. | | |
| 2017/0142201 A1* | 5/2017 | Holmes | ............... | A63F 13/355 |
| 2017/0238022 A1* | 8/2017 | Kottana | ............... | H04N 19/895 |
| | | | | 375/240.27 |
| 2018/0143932 A1* | 5/2018 | Lawless | ............... | G06F 13/4282 |

OTHER PUBLICATIONS

Forrester, Vade; Hardware Review of: Microsoft Internet keyboard; 2000; retrieved from the Internet <URL: http://alamopc.org/pcalamode/reviews/archive2/rev040001.htm>; pp. 1-2 as printed. (Year: 2000).*

"USB subsystem in HelenOS," available at <<http://helenos-usb.sourceforge.net/manual/>>, published on Jun. 2, 2011, 41 pages.

"Install and Control More Than One Mouse or Keyboard on One Computer," available at <<https://www.raymond.cc/blog/installmultiple-mouse-and-keyboard-on-one-computer/>>, retrieved on Jan. 25, 2017, 7 pages.

"AnywhereUSB: Network-Attached USB Hubs," available at <<https://www.digi.com/products/usb-and-serial-connectivity/usb-over-ip-hubs/anywhereusb>>, Digi International Inc., retrieved on Jan. 25, 2017, 3 pages.

Bach, Matt, "Multi-headed VMWare Gaming Setup," available at <<https://www.pugetsystems.com/labs/articles/Multi-headed-VMWare-Gaming-Setup-564/>>, Puget Systems, published on Jul. 9, 2014, 10 pages.

"USB," available at <<https://en.wikipedia.org/wiki/USB>>, Wikipedia article, retrieved on Jan. 26, 2017, 26 pages.

Diallo, Amadou, "Google Wants to Make Your Passwords Obsolete", «https://www.forbes.com/sites/amadoudiallo/2013/11/30/google-wants-to-make-your-passwords-obsolete/#2e129ae011d4», Nov. 30, 2013, 4 pages.

Yubico, "RFiD Yubikey", captured from the Internet archive at «https://web.archive.org/web/20110829223639/https:/store.yubico.com/store/catalog/product_info.php?products_id=17», Aug. 29, 2011, 2 pages.

Yubico, "Yubico Innovation History", captured at «https://www.yubico.com/about/yubico-innovation-history/», Jul. 18, 2019, 2 pages.

Wikipedia, "YubiKey", captured from the Internet archive at «https://web.archive.org/web/20161224031709/https://en.wikipedia.org/Wiki/YubiKey», Dec. 24, 2016, 2 pages.

* cited by examiner

ACCESS-RELATED INFORMATION (CAN BE DISTRIBUTED AMONG PLURAL STORES)

AUTHENTICATION INFORMATION

| USER | TAG | PERIPHERALS | OPTIONAL AUTHORIZATION INFORMATION |
|---|---|---|---|
| USER X (AND USER INFO) | $ID_X$ | $P_1$, $P_2$, $P_3$ (IN) (IN) (IN) | • CAN ACCESS ANY FUNCS OF APP1, APP2<br>• CAN ACCESS DOCS IN APP3 IN READ-ONLY MODE |
| USER Y (AND USER INFO) | $ID_Y$ | $P_4$, $P_5$ (IN) (IN) | • CAN ACCESS ALL FUNCS OF APP1 |
| USER Z (AND USER INFO) | $ID_Z$ | $P_6$, $P_7$ (IN) (OUT) | • CAN ACCESS ALL FUNCS OF APP3 |
| ETC. | | | |

USER CREDENTIALS OBTAINED FROM THE ID-BEARING COMPONENT AND/OR OTHER SOURCE(S)

FIG. 6

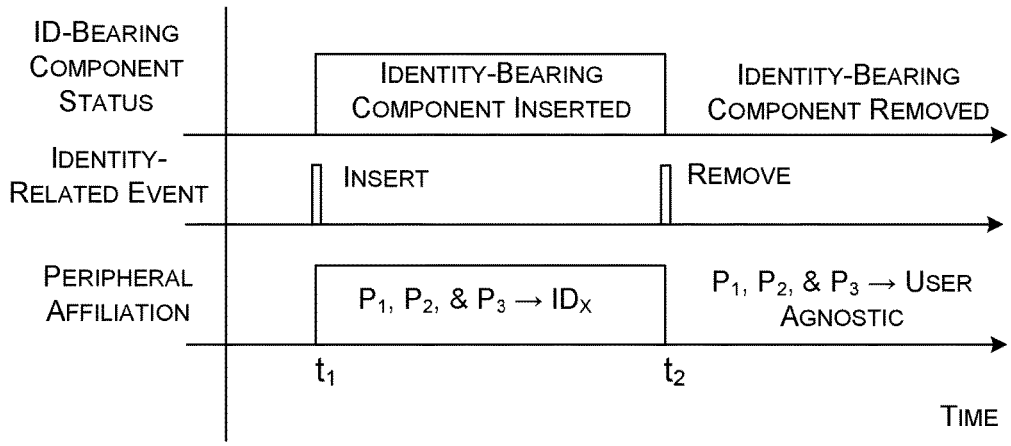

> RECEIVE AN IDENTITY-BEARING MESSAGE FROM A HUB DEVICE. THE IDENTITY-BEARING MESSAGE: (A) INDICATES THAT AN IDENTITY-BEARING COMPONENT HAS BEEN COMMUNICATIVELY COUPLED TO THE HUB DEVICE; AND CONVEYS USER INFORMATION ASSOCIATED WITH A FIRST USER, AS PROVIDED BY THE IDENTITY-BEARING COMPONENT. THE HUB DEVICE IS ALSO COMMUNICATIVELY COUPLED TO ONE OR MORE INPUT/OUTPUT PERIPHERAL DEVICES.
> 1004

↓

> PROVIDE ACCESS-RELATED INFORMATION IN A DATA STORE BASED ON THE USER INFORMATION. THE ACCESS-RELATED INFORMATION INDICATES THAT THE FIRST USER IS ASSOCIATED WITH ALL PERIPHERAL DEVICES COUPLED TO THE HUB DEVICE. FURTHER, THE ACCESS-RELATED INFORMATION PROVIDES AUTHENTICATION INFORMATION ASSOCIATED WITH THE FIRST USER, FOR USE IN AUTHENTICATING THE FIRST USER.
> 1006

↓

> GOVERN INTERACTION BY THE FIRST USER WITH AN APPLICATION, VIA ONE OF THE PERIPHERAL DEVICES, BASED ON THE ACCESS-RELATED INFORMATION.
> 1008

↓

> RECEIVE ANOTHER IDENTITY-BEARING MESSAGE FROM THE HUB DEVICE THAT INDICATES THAT THE IDENTITY-BEARING COMPONENT HAS BEEN COMMUNICATIVELY DECOUPLED FROM THE HUB DEVICE.
> 1010

↓

> UPDATE THE ACCESS-RELATED INFORMATION TO INDICATE THAT THE FIRST USER IS NO LONGER ASSOCIATED WITH THE HUB DEVICE AND THE PERIPHERAL DEVICES COUPLED THERETO.
> 1012

FIG. 10

INTERACTING WITH A COMPUTING DEVICE VIA IDENTITY-BEARING PERIPHERAL DEVICES

BACKGROUND

In common practice, a user gains access to a target resource (such as an entire computing device or an application running on the computing device) by manually entering user information (such as a password, etc.) into the computing device, when prompted to do so by the computing device. Alternatively, or in addition, the user may supply at least some of the user information by specifying a location at which the user information has been stored in advance. The computing device grants the user access to the target resource when it successfully authenticates the user based on the user information. The user then remains free to interact with the target resource using any peripheral device or devices.

While such a technique is ubiquitous, a user may experience it as inefficient and cumbersome in nature. Further, the technique may not be fully appropriate for many use scenarios, such as the case in which plural users seek to gain access to a shared application in a group setting.

SUMMARY

A technique is described herein by which a user may gain access to a target resource via one or more particular peripheral devices that have been associated with the user. In one manner of operation, the technique operates by receiving an indication that the user has communicatively coupled an identity-bearing component to a hub device. That component is referred to as "identity-bearing" because it conveys user information associated with the user. In response to receiving the indication, the technique establishes access-related information based on the user information that: (a) associates all peripheral devices that are coupled to the hub device (and the hub device itself) with the user; and (b) provides authentication information associated with the user for use in authenticating the user. Assume that, in addition to the identity-bearing component, a collection of peripheral devices is currently coupled to the hub device, e.g., through which the user may supply input event information and/or receive output event information. The user may thereafter use any one of these peripheral devices to interact with the target resource, in a manner specified by the access-related information.

According to another feature, the user may thereafter remove the identity-bearing component from the hub device. In response to this action, the technique will update the access-related information to reflect that the user is no longer associated with the collection of peripheral devices that are coupled to the hub device.

According to another feature, plural users may couple respective identity-bearing components to plural respective hub devices. As a result, the technique permits these users to interact with a shared target resource (e.g., corresponding to a shared application) via different respective peripheral devices. Moreover, a user may receive user-specific output event information from a shared target resource via an output peripheral device (e.g., a display device) that is coupled to the user's hub device; that output event information is not shared with other users who are also interacting with the shared target resource. This allows the user to take part in the shared user experience, while still receiving private information.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows one implementation of access-related information provided by the system of FIG. 1.

FIG. 7 shows a sequence of operations performed by the system of FIG. 1 in response to a user coupling and decoupling an identity-bearing component to a hub device.

FIG. 10 is a flowchart that describes an overview of one manner of operation of the system of FIG. 1.

Figure 1:
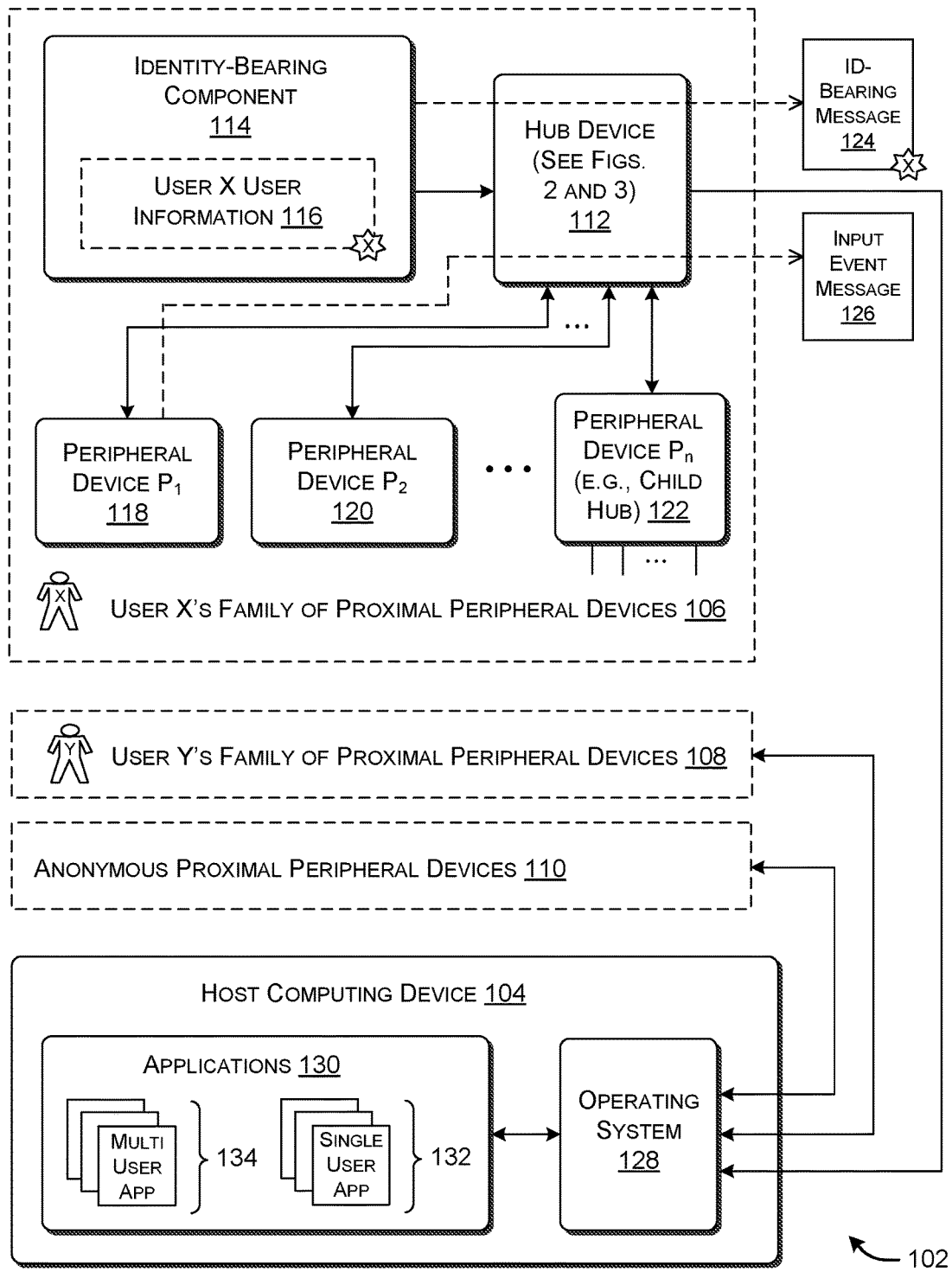
FIG. 1 shows a system by which users may gain access to and interact with a target resource (e.g., an application) via user-specific peripheral devices.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for allowing users to interact with a target resource using user-specific interface channels associated with particular peripheral devices. Section B sets forth an illustrative process that explains the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 that allows a user to gain access to a target resource (such as an application) by leveraging particular interaction channels that are associated with the user. By way of overview, the user first uses an identity-bearing component to convey user information to a host computing device 104. In response, the host computing device 104 establishes access-related information based on the user information. The access-related information establishes a nexus between the user and a collection of input/output peripheral devices. The access-related information also specifies authentication information for use in authenticating the user. The host computing device 104 then governs the user's interaction with the target resource, via the peripheral devices, based on the access-related information.

FIG. 1 specifically shows that two users (user X and user Y) interact with the host computing device 104. A first family of peripheral devices 106 is associated with user X, while a second family of peripheral devices 108 is associated with user Y. More generally, the system 102 can enable any number of users, associated with respective collections of peripheral devices, to interact with the host computing device 104. The system 102 can also optionally enable any user to interact with the host computing device 104 in a peripheral-agnostic manner via a collection of anonymous peripheral devices 110, corresponding to devices that have not been associated with any particular user. In many use scenarios, the expectation is that the peripheral devices in each family are within relatively close distance to each other, such as, without limitation, within 2 meters of each other in one example.

Figure 2:
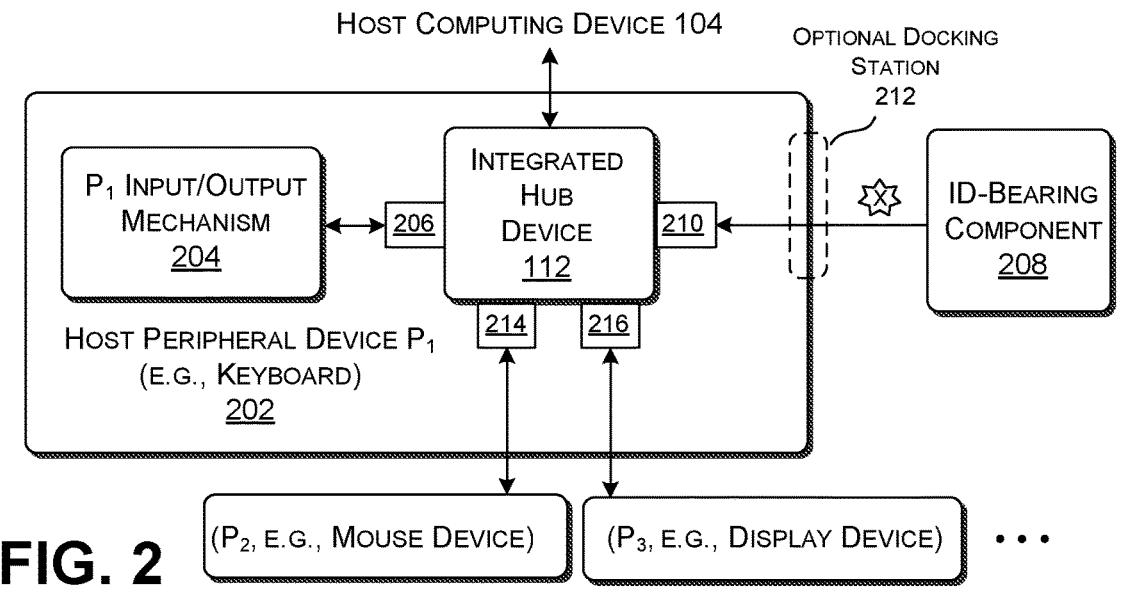
FIG. 2 shows one implementation of a hub device, which is a component of the system of FIG. 2.
Figure 3:
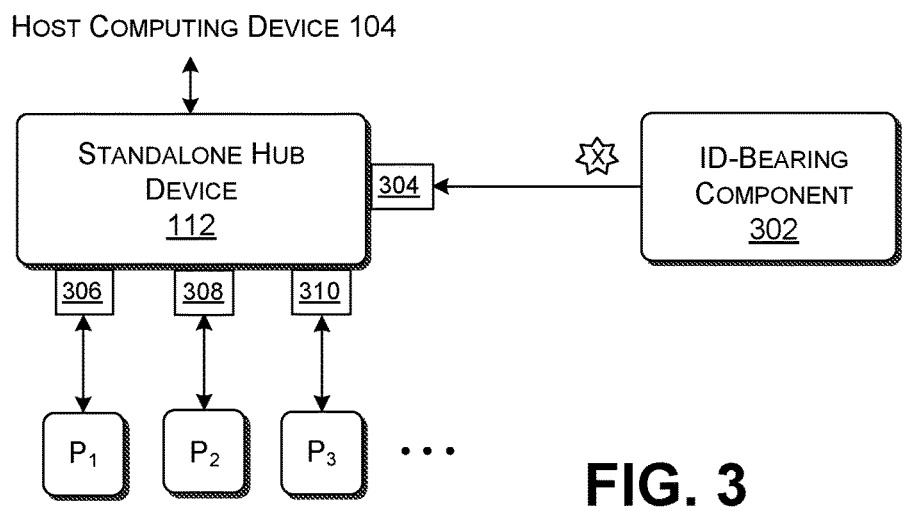
FIG. 3 shows another implementation of the hub device.

Consider the collection of peripheral devices 106 associated with user X in further detail. The collection includes at least one hub device 112. The hub device 112 serves as a routing mechanism for coupling other peripheral devices in the collection of peripheral devices 106 to the host computing device 104, via respective ports. FIGS. 2 and 3, to be described below, show two respective implementations of the hub device 112.

One port of the hub device 112 interacts with an identity-bearing component 114. In the example of FIG. 1, the identity-bearing component 114 corresponds to a mechanism that directly couples with the hub device 112. This kind of identity-bearing component 114 corresponds to a first type of identity-bearing component that constitutes a peripheral device in its own right. In other cases, an identity-bearing component corresponds to a mechanism that couples to a separate reading device, which, in turn, is connected to the hub device. This type of identity-bearing component corresponds to a second kind of information-bearing component; here, the combination of the identity-bearing component and the reading device constitutes a peripheral device in its own right. To facilitate explanation, the following explanation will emphasize the use of the first type of identity-bearing component; but the principles described herein apply with equal force to the second type of identity-bearing component.

An identity-bearing component of the first type can correspond to any kind of device that can be coupled to the hub device 112 and can share information with the hub device 112. For instance, the identity-bearing component 114 may correspond to a storage device of any type, such as a solid-state flash drive device. In another case, the identity-bearing component 114 corresponds to any type of input peripheral device and/or any type of output peripheral device that carries user information. In another case, the identity-bearing component 114 corresponds to a handheld computing device of any type, such as a smartphone. An identity-bearing component of the second type can correspond, for instance, to any type of active or passive information-bearing key or card having any form factor.

The identity-bearing component 114 is so-named because it provides user information pertaining to user X to the hub device 112. The user information can include different information items in different implementations. For instance, the user information can include credential-related information for primary use in authenticating the user (e.g., verifying the identity of the user), including any of: given and family name information, user name information, password information, account number information, address information, voice signature information, face signature information, iris scan signature information, etc. In some implementations, the user information can also include authorization information that describes rights conferred to the user with respect to one or more target resources (e.g., applications, etc.).

As will be described below, the user information provided by the identity-bearing component 114 may constitute seed information. The host computing device 104 can supplement this seed information by adding more authentication and/or authorization information obtained from one or more additional sources.

In some implementations, the user information is formed as one or more certificates provided by one or more trusted certificate authorities (CAs). A CA vouches for the veracity of the user information. In other implementations, the user information does not include any such guarantees from a certificate authority.

The collection of peripheral devices 106 also includes one or more peripheral devices, such as peripheral device 118 and peripheral device 120. A peripheral device may correspond to an input peripheral device through which a user may provide input event information to the host computing device 104, and/or an output peripheral device through which a user may receive output event information from the host computing device 104. Examples of input peripheral devices include a keyboard, a mouse device, a pen device, etc. Examples of output peripheral devices include a display device, a printer, a storage device, a network interface, etc.

The collection of peripheral devices 106 can also include zero, one or more child hub devices, such as representative child hub device 122. A child hub device, in turn, may include ports that communicatively couple one or more additional input/output peripheral devices and/or one or more child hub devices. Any peripheral device (118, 120, 122) can be coupled to the hub device 112 via a hardwired connection and/or via a wireless connection of any type.

As will be described in greater detail below, as a result of the user X coupling the identity-bearing component 114 with the hub device 112, the user conveys that: (a) the hub device 112 is to be subsequently associated with the user X; and (b) all subordinate peripheral devices directly or indirectly coupled to the hub device 112 are to be subsequently associated with the user X. In the example of FIG. 1, these subordinate peripheral devices include the peripheral device 118 and the peripheral device 120, the child hub device 112, and any peripheral device coupled to the child hub device 122 (not specifically shown in FIG. 1). In other words, by virtue of establishing nexus with a particular node in a hierarchical organization of peripheral devices, the user establishes a nexus with that node and any child nodes associated therewith.

The hub device 112 sends an identity-bearing message to the host computing device 104 when the user first couples the identity-bearing component 114 to the hub device 112. The identity-bearing message conveys the user information associated with the user X. The hub device 112 sends another identity-bearing message when the user decouples the identity-bearing component 114 from the hub device 112. At any given time, an input peripheral device can send an input event message to the host computing device 104, which conveys input event information pertaining to an input action that has been performed by the user X via the input peripheral device. Further, at any given time, an output peripheral device can receive an output event message from the host computing device 104; the output event message conveys output event information provided by a target resource, such as an application.

Figure 8:
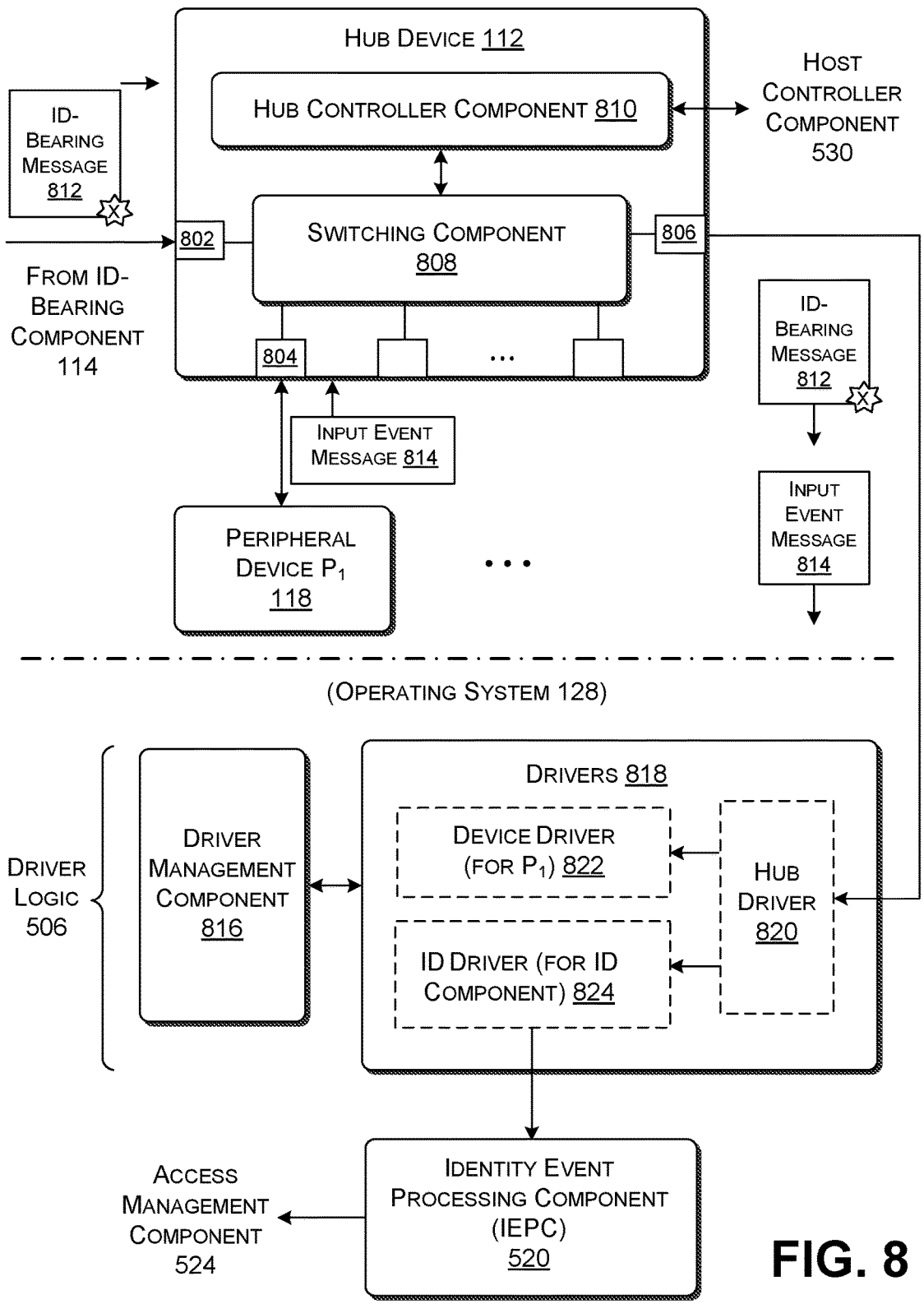
FIG. 8 shows one mechanism for conveying an identity-bearing message and an input event message in the system of FIG. 1.
Figure 9:
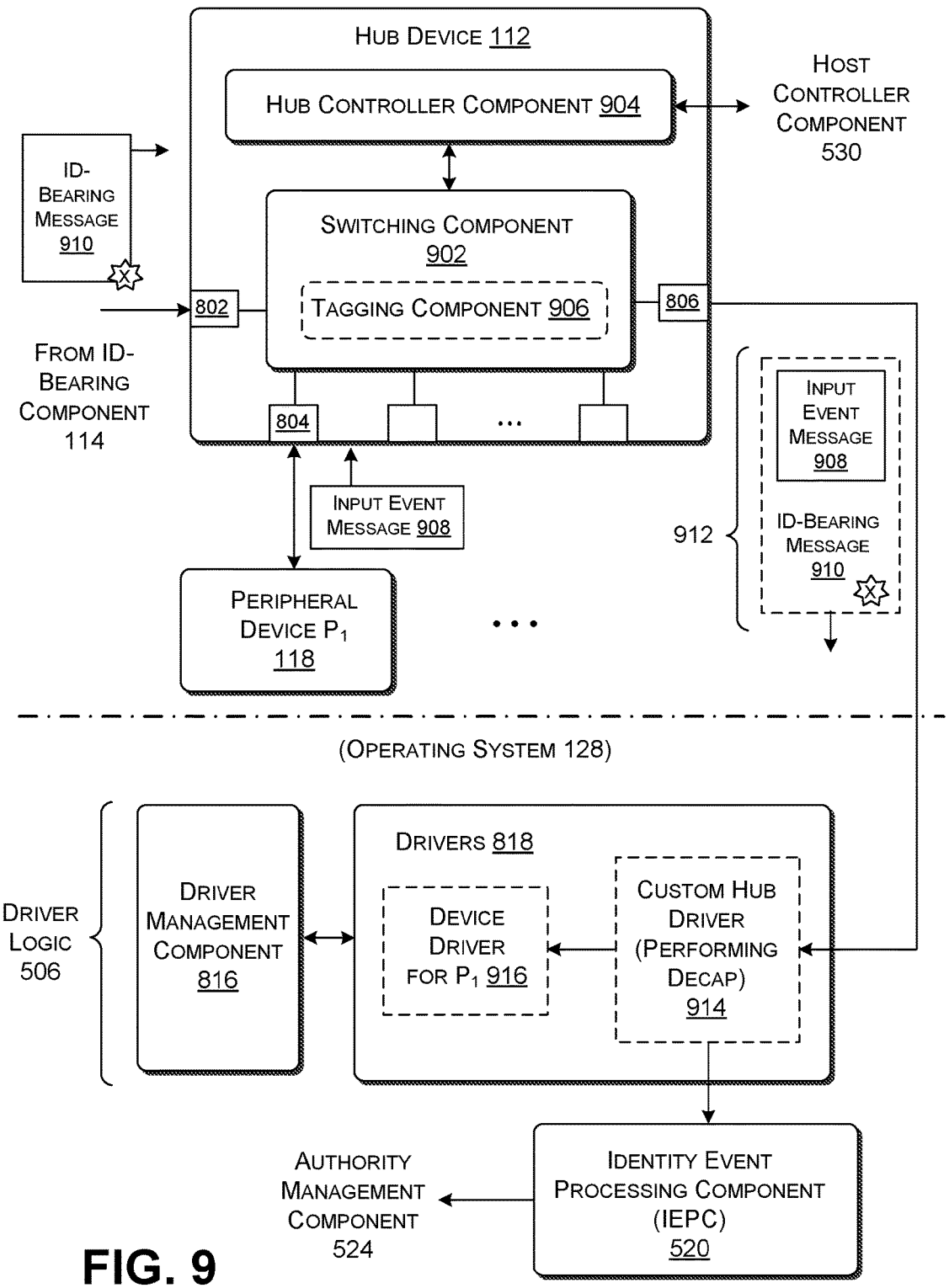
FIG. 9 shows another mechanism for conveying an identity-bearing message and an input event message in the system of FIG. 1.

FIG. 1 generically shows that the hub device 112 can send an identity-bearing message 124 from the identity-bearing component 114 and an input event message 126 from the peripheral device 118. FIGS. 8 and 9 show two messaging protocols that can be used to send these messages (124, 126). By way of preview to a later explanation of those figures, FIG. 8 shows the case in which the hub device 112 sends the identity-bearing message 124 and the input event message 126 as two separate messages. FIG. 9 shows a case in which the hub device 112 encapsulates the input event message 126 within the identity-bearing message 124, or vice versa. The host computing device 104 can receive all such messages from the peripheral devices in the system 102 via a root hub device (not shown).

The host computing device 104 itself can correspond to any kind of computing apparatus having any form factor. For instance, the host computing device 104 can correspond to a stationary personal computing device, a laptop computing device, any type of handheld computing device (such as a smartphone, a tablet-type computing device, etc.), a wearable computing device, a game console, a set-top box, etc., or any combination thereof. The host computing device 104 can include an operating system 128 and one or more applications 130. The applications 130 can correspond to programs that are locally stored by the host computing device 104. Alternatively, or in the addition, the applications can correspond to programs (e.g., web applications) that are provided by one more or more remote computing systems. The host computing device 104 can access a remote resource via a wide area network (such as the Internet), e.g., via a browser component.

The applications 130 can include any combination of single-user applications 132 and multi-user applications 134. A single-user application is an application that permits only one user to interact with an application instance at a given time. For example, a word processing application may correspond to a single-use application that allows only a single user to interact with an application instance at any time. A multi-user application is an application that permits two or more users to simultaneously interact with an application instance at a given time. For example, a game application corresponds to a multi-user application that allows two or more users to control respective characters in the game. A collaborative application corresponds to a multi-user application that allows two or more meeting participants to interact with a shared user interface presentation during a meeting, e.g., by controlling respectively cursors within the presentation and performing other actions via the shared user interface presentation.

Overall, the system 102 can be built using the base resources provided by one or more underlying protocols. In one case, for instance, the system 102 can use the Universal Serial Bus (USB) protocol to govern the discovery of newly added or removed peripheral devices, the management of power within the system 102, and so on. The USB protocol is described in Universal Serial Bus Specification, revision 2.0, Apr. 27, 2000.

FIG. 2 shows one implementation of the hub device 112 of FIG. 1. Here, the hub device 112 is incorporated as an element in a host peripheral device 202. For example, the host peripheral device 202 may correspond to a keyboard that incorporates the hub device 112 as an internal component of the keyboard, or as a detachable component of the keyboard.

More generally, the host peripheral device 202 may correspond to any input peripheral device and/or any output peripheral device. The host peripheral device 202 device may include any input/output mechanism 204 for receiving input event information or presenting output event information. In the case in which the host peripheral device 202 corresponds to a keyboard, the input/output mechanism 204 corresponds to the keys provided by the keyboard and the mechanisms for registering the actuation of the keys by the user. The hub device 112 is coupled to the input/output mechanism via a port 206.

FIG. 2 also shows that the hub device 112 directly interacts with an identity-bearing component 208 of the above-described first type via a port 210. In one example, the identity-bearing component 208 corresponds to a portable storage device (such as a USB solid-state flash drive) that connects to the hub device 112 via an electrical contact-type connection. For instance, the host peripheral device 202 may include a female receptacle (not shown) or some type of docking station 212 to which the portable storage device may be physically coupled. Once physically inserted into the receptacle or docking station 212, the storage device supplies its user information to the hub device 112 via an electrical contact-type connection, e.g., as governed by the USB protocol.

In another example, the identity-bearing component 208 can correspond to a portable storage device that wirelessly transfers its user information to the port 210, when placed in proximity to the host peripheral device 202 or placed within the docking station 212. For instance, the portable storage device can use Near Field Communication (NFC) or some other wireless communication mechanism to forward the user information to the port 210. The storage device and/or the host peripheral device 202 can also optionally include a fastening member for detachably securing the storage device to the host peripheral device 202. For instance, the storage device can include a magnetic element, a clip, a VELCRO strip, etc. for securing the storage device to a complementary fastening member of the host peripheral device 202. Alternatively, the docking station 212 can correspond to a depression in the housing of the host peripheral device 202 on which the user my place the identity-bearing component 208.

In another example, the identity-bearing component 208 (of the first type) can correspond to some other peripheral device that performs an input function and/or output function. For instance, that peripheral device can correspond to an input device that already stores user information, such as a passive or active pen device. The pen device can supply its user information to the hub device 112 when the pen device is mounted to the docking station 212, or when the pen device is moved within prescribed proximity to the host peripheral device 202 (e.g., by using NFC or some other wireless communication mechanism). By virtue of this manner of operation, the user may propagate user information established with respect to one input/output peripheral device to other input/output peripheral devices.

In another example, the identity-bearing component 208 (of the first type) can correspond to some type of handheld computing device, such as a smartphone. The handheld computing device can supply the user information to the hub device 112 when the handheld computing device is mounted to the docking station 212, or when the handheld computing device is moved within prescribed proximity to the host peripheral device 202 (e.g., by using NFC or some other wireless communication mechanism).

The host peripheral device 202 can form a connection with the identity-bearing component 208 through yet additional modes of communication and physical coupling strategies; the above examples are cited by way of example, not limitation. Further, although not shown, the hub device 112 can alternatively interact with an identity-bearing component of the second type (such as a passive or active card or key) via a separate reading mechanism. In that case, the reading mechanism would be coupled to the hub device 112 via the port 210, and the identity-bearing component would interact with the reading apparatus via a contact-type electrical connection and/or a wireless connection.

Finally, the hub device 112 can optionally include one or more ports (214, 216, . . . ) for receiving input event information from one or more input peripheral devices, and/or for forwarding output event information to one or more output peripheral devices. For example, one such input peripheral device may correspond to a mouse device. One such output peripheral device may correspond to a display device that is mounted to the face of a keyboard, e.g., in a peripheral region adjacent to the keyboard's keys. Alternatively, or in addition, the hub device 112 can include one or more ports for interacting with a child hub device (not shown).

FIG. 3 shows a case in which the hub device 112 corresponds to a standalone device that performs a routing function, and is not incorporated into a more encompassing host peripheral device. More specifically, the hub device 112 receives user information from an identity-bearing computing device 302 of the first type via a port 304. The hub device 112 could alternatively interact with an identity-bearing computing device of the second type via a reading apparatus (not shown). In addition, the hub device 112 interacts with one or more peripheral devices (corresponding to input peripheral devices and/or output peripheral devices) and/or child hub devices via associated ports (306, 308, 310).

In some implementations, the hub device 112 shown in FIGS. 2 and 3 provides no fixed assignment of particular kinds of peripheral devices to particular ports. In this case, the user remains free to insert an identity-bearing component of the first type into any port. The hub device 112 can recognize the presence of an identity-bearing component coupled to one of its ports using various strategies. For instance, the hub device 112 can recognize the identity-bearing component based on the fact that it supplies user information of a particular type. Alternatively, or in addition, the hub device 112 can recognize the presence of an identity-bearing component based on device-identifying metadata supplied by the identity-bearing component. That metadata identifies the identity-bearing component as a special type of peripheral device that carries user information.

In other implementations, the hub device 112 assigns a particular port for use in receiving user information via an identity-bearing component, either directly or through a separate reading apparatus. Here, the hub device 112 can recognize the presence of an identity-bearing component by virtue of the fact that the component is coupled to the specially-assigned port. The hub device 112 can also recognize the presence of the identity-bearing component in any of the ways described above.

In summary to FIGS. 1-3, the system 102 may confer various advantages in different use scenarios. First, the system 102 provides a convenient and user-friendly way for a user to establish his or her identity (and associated authentication information) by plugging (or otherwise coupling) an identity-bearing component into a hub device. The hub device may correspond to a standalone hub device (as in the case of FIG. 3) or a hub device that is incorporated into another peripheral device (as in the case of FIG. 2). This method of authenticating the user avoids the need for the user to manually supply credential information.

Second, the system 102 allows the user to establish his or her identity (and associated authentication information) in a manner that is readily portable from environment to environment. For instance, the user may use the same portable identity-bearing component to establish his or her identity within separate computing systems that use different authentication/authorization frameworks. This avoids the need for the user to perform a separate setup/configuration operation with respect to each computing system with which he or she interacts.

Third, the system 102 provides a relatively private way for the user to establish his or her identity. This advantage may be particularly noteworthy in a group setting. For instance, the user may be reluctant to manually supply credential information into a shared user interface presentation that is potentially observable by other participants of a meeting. But the user may be more willing to perform the less intrusive task of inserting a personal identity-bearing component into a hub-bearing keyboard that is present in the meeting room, and which the user has chosen as his or her keyboard with which to interact with a shared application.

Fourth, the system 102 provides a way for a user to take part in a shared user experience when interacting with a shared application, while still receiving private output event information. For instance, the user may receive the private output event information via a display device that is coupled to a hub device that is associated with the user, by virtue of the fact that the user has coupled his or her information-bearing component to the hub device.

Fifth, the system 102 can efficiently utilize existing peripheral and computing equipment. For example, the system 102 provides a way of associating user information with an existing mouse device by simply plugging the mouse device and an identity-bearing component into the same hub device. No modification is required to the mouse device itself or the driver associated with the mouse device. The system 102 can also be efficiently integrated into existing computing systems. For example, the system 102 can feed user information into different authentication/authorization frameworks without requiring a wholesale reengineering of these existing authentication/authorization frameworks.

The advantages described above are cited by way of example, not limitation. Other implementations can leverage the system 102 to produce other benefits not specified above.

The system 102 can be extended in different ways. For example, in one extension, the system 102 can allow two or more users to insert (or otherwise couple) their identity-bearing components into a single hub device 112. The host computing device 104 will subsequently store access-related information that indicates that any of these users are authenticated to interact with one or more applications via peripheral devices that are also coupled to the hub device 112.

In another extension, the host peripheral device 202 of FIG. 2 can include an input mechanism (e.g., a button) that, when actuated by a user, will send a signal to the host computing device 104. That signal instructs the host computing device 104 to remove the affiliation between the user and the hub device 112 associated with the host peripheral device 202. In this implementation, the act of removing the identity-bearing component 208 need not constitute an instruction to remove the association between the user and the host peripheral device 202. The same capability can be added to the standalone hub device 112 of FIG. 3.

Figure 4:
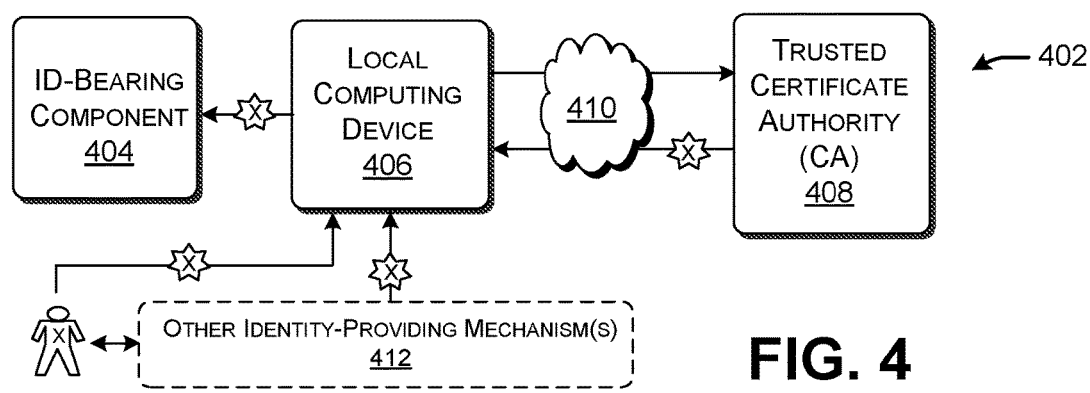
FIG. 4 shows a security framework for supplying user information to be stored on an identity-bearing component, in the context of the system of FIG. 1.

FIG. 4 shows a framework 402 for producing the user information pertaining to user X, for storage in an identity-bearing component 404. In one example, a local computing device 406 supplies input information to a certificate authority (CA) 408 via a computer network 410 (e.g., the Internet). In response, the CA 408 returns one or more certificates. Each certificate provides user information pertaining to the user X. Each certificate also constitutes an assurance that the CA 408, regarded by default as a trusted entity, has vouched for the validity of the user information. The input information fed to the CA 408 constitutes whatever environment-specific evidence that the particular CA 408 needs to issue the certificate(s). The CA 408 cryptographically signs the certificate(s) to indicate that they originate from the CA 408.

Alternatively, or in addition, the user X, or someone acting on behalf of the user X, can manually supply at least some user information. Such user information can include given and family name information, user name information, password information, account number information, address information, etc.

Alternatively, or in addition, the framework 402 can receive some user information from one or more other identity-providing mechanisms 412. Such other identity-providing mechanisms 412 can include a face recognition mechanism, a fingerprint recognition mechanism, an iris-scanning mechanism, a voice recognition mechanism, etc. or any combination thereof. Each such other identity providing mechanism can provide a digital signature that describes at least one characteristic of the user X.

As noted above, the user information can optionally include (or omit) supplemental authorization information. If included, the authorization information may describe the rights conferred to the user X with respect to one or more target resources (e.g., applications, etc.). For example, one piece of authorization information may indicate that the user X has the authority to access certain application functions, but not other application functions.

Figure 5:
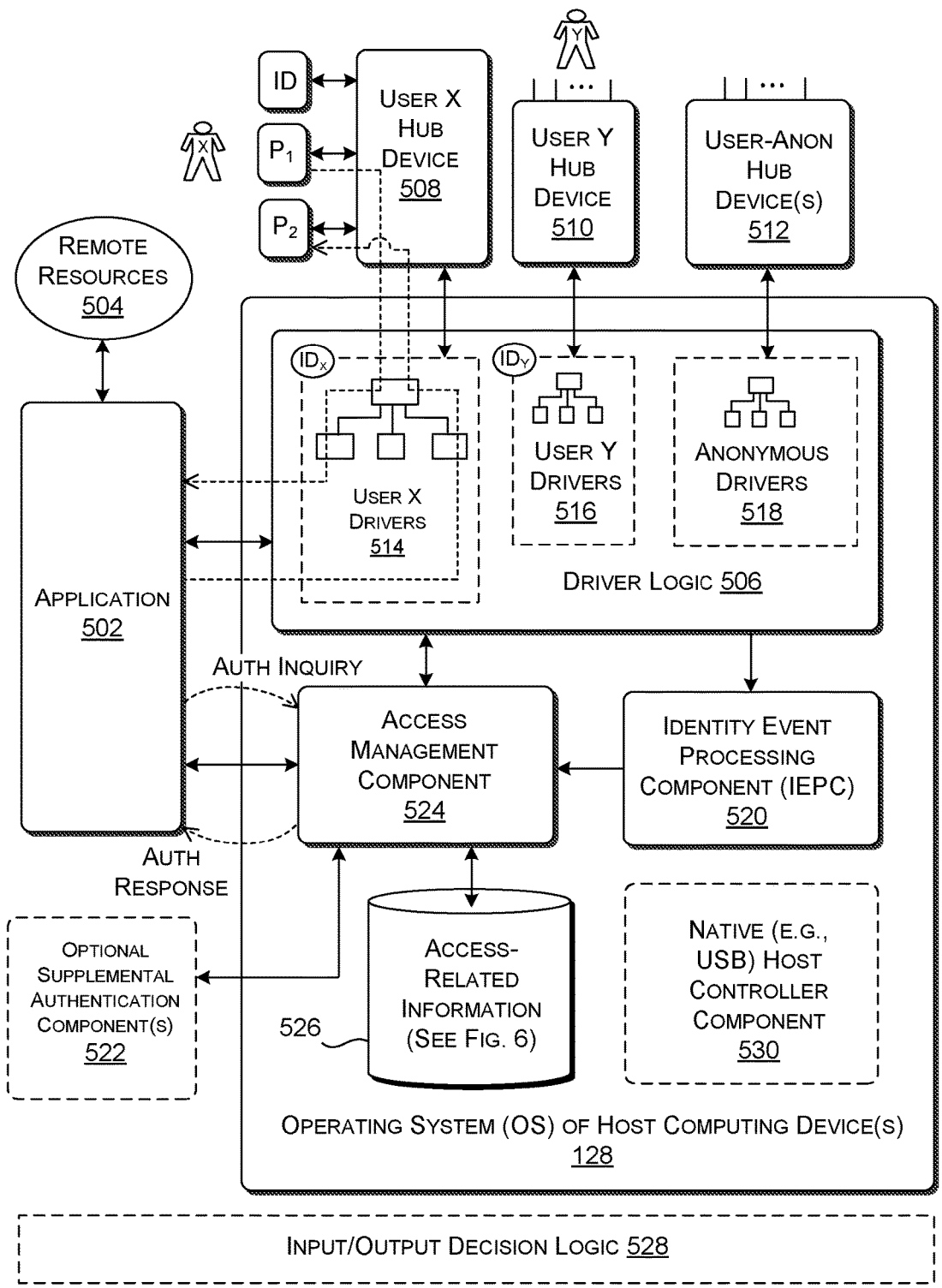
FIG. 5 shows details of an operating system of a host computing device in the system of FIG. 1.

FIG. 5 shows details of the operating system 128 of the host computing device 104 in the system 102 of FIG. 1. The operating system 128 may interact with a plurality of applications 130 via operating system shell functionality (not shown). FIG. 5 shows one representative application 502. The application 502 can correspond to locally-stored program. That application 502 may or may not involve interaction with one or more remotely-implemented resources 504. For example, the application 502 may involve interaction with a cloud-computing platform that performs certain computation-intensive processing tasks. In another case, the application 502 corresponds to a program that is wholly implemented in remote fashion, e.g., corresponding to a web application hosted by one or more remote servers.

The operating system 128 includes driver logic 506 (implemented at the operating system's kernel level) for interacting with one or more hub devices and the other peripheral devices respectively coupled thereto. FIG. 5 specifically presents an example in which the driver logic 506 includes drivers for interacting with a first hub device 508, a second hub device 510, and third hub device(s) 512. Assume that a user X couples an identity-bearing component to the first hub device 508, transforming the first hub device 508 into an asset associated with user X. Assume that user Y couples another identity-bearing component to the second hub device 510, transforming the second hub device 510 into an asset associated with user Y. Assume that no user has yet coupled any identity-bearing component into the third hub device(s) 512, which means that the third hub device(s) 512 remain anonymous or user-agnostic hub devices.

Each driver associated with a particular kind of input peripheral device includes logic for interpreting input event information supplied by that input peripheral device. Each driver associated with a particular kind of output peripheral device includes logic for formatting output event information supplied by the application 502, for consumption by the output peripheral device. Each driver associated with a hub device includes logic by which the operating system 128 interacts with the hub device and interprets input event information supplied by the hub device.

More specifically, the driver logic 506 includes a driver management component (not shown in FIG. 5) for discovering each hub device and each peripheral device coupled to each hub device, e.g., based on a USB discovery and device enumeration protocol. The driver management component also discovers the way in which the various peripheral devices are coupled together. In response to this operation, the driver management component loads instances of drivers associated with the particular kinds of peripheral devices that it has discovered. The driver management component organizes those drivers in a manner which reflects the discovered relationships among the peripheral devices.

In the particular example of FIG. 5, the driver management component provides a first collection of drivers 514 to process the input event information and/or the output event information associated with the peripheral devices coupled to the first hub device 508 (pertaining to user X). The driver management component provides a second collection of drivers 516 to process the input event information and/or the output event information associated with the peripheral devices coupled to the second hub device 510 (pertaining to user Y). And the driver management component provides a third collection of drivers 518 associated with the third hub device(s) 512 (having no user affiliation). For instance, each collection of drivers may include drivers coupled together in a hierarchical organization in which the hub device driver represents the parent node of that organization.

An identity event processing component (IEPC) 520 determines whether the stream of messages processed by the driver logic 506 includes evidence that an identity-bearing component has been added or removed from a hub device. This evidence can take various forms in different implementations. For instance, in some implementations (corresponding to the to-be-discussed example of FIG. 8), a hub device may send one kind of identity-bearing message when a user first couples an identity-bearing component to the hub device. A hub device may send another type of identity-bearing message when the user decouples the identity-bearing component from the hub device. In other implementations (corresponding to the to-be-discussed example of FIG. 9), the hub device may send an identity-bearing message in conjunction with each input event message, reflecting whether or not an identity-bearing component is currently connected to the hub device.

The IEPC 520 can detect an identity-bearing message in different ways, such as by detecting a message that is specifically designated as an identity-bearing message, e.g., by virtue of metadata associated with the message that identifies it as an identity-bearing message. Alternatively, or in addition, the IEPC 520 can detect an identity-bearing message based on an indication that it stores user information of a particular nature.

In any such case, when the IEPC 520 receives an indication that a new identity-bearing component has been associated with a hub device, it extracts the user information supplied by that identity-bearing component via an identity-bearing message.

In some implementations, one or more supplemental authentication components 522 can generate additional user information from one or more additional sources of user information. For instance, a supplemental authentication component can request the user to manually specify a password and/or supply other identifying information. Alternatively, or in addition, a supplemental authentication component can request the user to interact with a voice recognition mechanism, a face recognition mechanism and/or an iris scanning mechanism, each of which supplies additional user information that describes some aspect of the user. In these cases, the user information supplied by the identity-bearing component is considered weak; a supplemental authentication component may request the user to provide additional user information to bolster the confidence with which the user is identified. In one implementation, the application 502 and/or the operating system 128 can implement the supplemental authentication component(s) 522.

A supplemental authentication component may interact with the user to obtain additional user information in response to different triggering events. In one case, a supplemental authentication component can collect additional user information immediately after the initial seed user information is obtained from the identity-bearing component. In another case, a supplemental authentication component collects additional user information when the user attempts to perform some function that requires heightened security. For example, a supplemental authentication component can ask the user to supply additional user information when the user attempts to interact with one or more of the remote resources 504.

An access management component 524 stores access-related information when the IEPC 520 determines that an identity-bearing component has been newly associated with a hub device. The access management component 524 updates that access-related information when the IEPC 520 indicates the identity-bearing component has been newly removed from the hub device. The access management component 524 stores the access-related information in one or more data stores 526. More generally, FIG. 5 depicts the access management component 524 as a single component of the operating system 128. While this indeed represents one implementation, in other cases, the operating system 128 and/or an application may allocate the functions attributed to the access management component 524 among two or components.

Advancing momentarily to FIG. 6, this figure shows one example of access-related information provided by the access management component 524. At a current point in time, there are three users (user X, user Y, and user Z) who have inserted or otherwise coupled identity-bearing components into respective hub devices. The access management component 524 can store the collected user information that pertains to each user as part of the access-related information. The access management component 524 can also assign an ID tag to each user and then store that ID tag as another part of the access-related information.

Further, the access management component 524 can store information that identifies the peripheral devices associated with each user. The access management component 524 can obtain this information by interacting with the driver logic 506, which reveals the nexus between an identity-bearing component and a collection of peripheral devices. In the example of FIG. 6, the access-related information indicates, for instance, that peripheral devices $P_1$, $P_2$, and $P_3$ are associated with the user X. The access-related information further indicates that these three peripheral devices are input (IN) peripheral devices. Based on this affiliation information, the driver logic 506 can associate each collection of device drivers with the user to which it pertains, e.g., by tagging the collection of drivers 514 with a user ID associated with user X. The driver logic 506 can leverage the tags by producing a stream of user-tagged input event messages and passing those tagged messages to the application 502, each such input event message indicating the user from which it originated (if known). Further, the driver logic 506 can leverage its tags by directing an output event message that pertains to a particular user to a corresponding driver and associated peripheral device.

The above-described subset of access-related information corresponds to authentication information for use in authenticating a user who seeks to interact with a target resource, such as the application 502. Authentication corresponds to the task of verifying the identity of the user in the course of determining whether the user is entitled to interact with a target resource. The access management component 524 can optionally store supplemental authorization information. The authorization information indicates the rights conferred to each user with respect to one or more target resources, above and beyond those associated with the authentication information. For instance, in the example of FIG. 6, the access-related information indicates that user X is permitted to access any functions of a first and second applications, and the user X is permitted to access documents in a third application in a read-only mode.

The access management component 524 can obtain the authorization information from one or more sources. For example, in some cases, the access management component 524 can obtain at least some authorization information from the user information provided by an identity-bearing component. Alternatively, or in addition, the access management component 524 can obtain at least some authorization information from a preexisting user profile associated with the user, e.g., as maintained by a preexisting authorization framework. Alternatively, or in addition, the access management component 524 can obtain at least some information from a remote source of authorization information, such as a remote CA.

Decision logic 528 provides one or more rules that define an environment-specific access policy. For example, one rule may state that a user is not permitted to access a single-user application unless that user it properly authenticated by the operating system 128 and/or the application. Such a rule would prohibit a user from interacting with an application via an anonymous hub (that is not coupled to any identity-bearing component). The decision logic 528 can be implemented by the operating system 128 and/or one or more applications.

The host computing device 104 leverages the access-related information in conjunction with the decision logic 528 to govern the manner in which each user is permitted to interact with the application 502. For example, assume that the user X identifies himself or herself by inserting an identity-bearing component into a hub device, and thereafter attempts to access application 502 using an input peripheral device that is also coupled to the hub device. To address this request, the application 502 may send an authentication request to the access management component 524. The access management component 524 responds by providing authentication information to the application 502, which enables the application 502 to determine whether the user X is entitled to access the application 502. Assume that the application grants the user X access to the application 502 based on the authentication information. By virtue of this process, the user X is thereby freed from the task of separately proving credential information in manual fashion; he or she simply inserts his or her identity-bearing component into a hub device, and uses an input peripheral device that is also coupled to the hub device to interact with the application 502. (But note that, in other cases, the application 502 may still ask the user to perform additional authentication operations.)

In another example, assume that the application 502 corresponds to a collaborative program that allows plural meeting participants to control respective cursors presented on a shared user interface presentation on a shared display device. More specifically, assume that three particular users who seek to use the application 502 have conveyed their user information by inserting respective identity-bearing components into respective hub devices. And assume that the application 502 subsequently determines that these three users are permitted to interact with the application 502 based on authentication information provided by the access management component 524. For each such user, the driver logic 506 can pass a stream of input event messages to the application 502, each describing the current (x, y) position of the user's cursor. The driver logic 506 can also tag each event message with ID information that identifies the user to which it pertains. The application 502 leverages this input event information to control a user-specific cursor within the shared display device.

In another example, assume that the application 502 provides output event information to a particular user. And further assume that this particular user is interacting with the application 502 via a keyboard having an internal hub device. Further assume that the keyboard has a port for receiving an identity-bearing component and that the user has coupled his or her identity-bearing component to the keyboard via that port. And finally assume that the keyboard includes an integrated display device. Upon verifying, based on the authentication information, that the user is entitled to receive the output event information, the application 502 can forward the output event information to the user's keyboard for presentation on the display device. This use scenario thus provides a way of sending output event information to a particular user, without sending that same output event information to other users who also may be interacting with the application 502. The host computing device 104 accommodates this manner of operation because the application 502 can selectively send output event information to different peripheral endpoints associated with different user IDs. At the same time, the application 502 can continue to send other shared output event information to all of the users.

Finally, the operating system 128 can include a native host controller component 530 for performing various background operations. For instance, such operations include the distribution of power among nodes in the network of coupled peripheral devices. In one implementation, the native host controller component 530 can perform such functions in the manner specified by the USB Specification.

FIG. 7 shows a sequence of operations performed by the system 102 of FIG. 1 in response to the user X coupling and decoupling the identity-bearing component 114 to the hub device 112. At time $t_1$, the user X adds the identity-bearing component 114 to the hub device 112. This constitutes a first identity-related event. The host computing device 104 responds by associating the user X with the other peripheral devices (118, 120, 122) that are also coupled to the hub device 112. At time $t_2$, the user X removes the identity-bearing component 114 from the hub device 112. This constitutes a second identity-related event. In response, the host computing device 104 removes the association between the user X and the other peripheral devices (118, 120, 122).

FIG. 8 shows one mechanism for conveying an identity-bearing message and an input event message to the host computing device 104 in the system 102 of FIGS. 1 and 5. Consider a simplified scenario in which the hub device 112 is communicatively coupled to the identity-bearing component 114 via port 802, and in which the hub device 112 is coupled to the peripheral device 118 (such as an input peripheral device) via a port 804. As to upstream connection, the hub device 112 is coupled to the host computing device 104 via a port 806.

In the example of FIG. 8, the hub device 112 includes a switching component 808 and a hub controller component 810. The switching component 808 operates as a router for switching packets among the ports of the hub device 112. The hub controller component 810 controls the operation of the switching component 808 (and other components of the hub device 112) based on internal logic and/or instructions received from the native host controller component 530.

In operation, the hub controller component 810 detects when the user first inserts (or otherwise couples) the identity-bearing component 114 into the hub device 112. In response, the hub device 112 issues a first identity-bearing message 812, e.g., as a first packet. The first identity-bearing message 812 conveys the user information imparted by the identity-bearing component 114. The first identity-bearing message 812 can also include metadata that indicates that the event being described is a device-insertion event (e.g., rather than a device removal event).

In one implementation, the hub device 112 can subsequently resend the first identity-bearing message 812 in certain circumstances, such as when the user powers up the system 102 after having shut it down. Alternatively, or in addition, the hub device 112 can repeat the first identity-bearing message 812 on a periodic basis, such as every 30 seconds. Alternatively, or in addition, the hub device 112 can repeat the first identity-bearing message 812 whenever it is explicitly asked to do so by the operating system 128.

The hub device 112 sends a second identity-bearing message (not shown in FIG. 8) when the user X removes the identity-bearing component 114 from the hub device 112. That message can include metadata that indicates that the event being described is a device-removal event.

Assume that, during the span of time in which the identity-bearing component 114 remains coupled to the hub device 112, the user interacts with the peripheral device 118 to produce input event information. In response, the hub device 112 sends an input event message 814 to the operating system 128. For example, the peripheral device 118 may correspond to a mouse device, and the input event message 814 conveys input event information that reflects the current (x, y) position of a cursor on a user interface presentation.

Now referring to the operating system 128, the driver logic 506 includes a driver management component 816 and a collection of drivers 818 that have been loaded by the driver management component 816. Assume that the driver management component 816 loads a hub driver 820 when it discovers the hub device 112. Assume that the driver management component 816 adds a device driver 822 when it discovers the existence of the peripheral device 118, and adds an identity (ID) driver 824 when it discovers the existence of the identity-bearing component 114.

The device driver 822 processes the input event message 814, while the identity driver 824 processes the identity-bearing message 812. The IEPC 520 extracts the user information from the output provided by the identity driver 824 and sends it to the access management component 524. The access management component 524 can then create access-related information that reflects that: (a) the user X has added the identity-bearing component 114 to the hub device 112; and (b) the user X is now associated with the peripheral device 118 due to the fact that the peripheral device 118 is also coupled to the hub device 112. The access management component 524 has knowledge of the devices coupled to the hub device 112 by interrogating the driver logic 506, e.g., which indicates what drivers are coupled to the hub driver 820.

FIG. 9 shows another mechanism for conveying an identity-bearing message and an input event message to the operating system 128 in the system 102 of FIG. 1. Assume that the same scenario described with respect to FIG. 8 applies to the example of FIG. 9. That is, the identity-bearing component 114 is inserted (or otherwise coupled) to the port 802 of the hub device 112. The peripheral device 118 (e.g., a mouse device) is coupled to the port 804 of the hub device 112. And the hub device 112 itself is coupled to the host computing device 104 via a port 806.

A switching component 902 performs the core task of routing messages among the ports of the hub device 112. A hub controller component 904 controls the operation of the switching component 902 (and other components of the hub device 112) through internal logic and/or its interaction with the complementary host controller component 530 provided by the operating system 128.

In the implementation of FIG. 9, the switching component 902 includes a tagging component 906. In operation, the tagging component 906 receives an input event message 908 from the peripheral device 118. The tagging component 906 can then query its ports to determine whether an identity-bearing component is currently coupled to the hub device 112. As noted above, assume that the identity-bearing component 114 is in fact coupled to the hub device 112. The tagging component 906 then wraps the input event message 908 in an identity-bearing message 910 (obtained from the identity-bearing component 114), to produce an integrated message 912. It then sends the integrated message 912 to the host computing device 104, e.g., as a single packet. That is, in the case of FIG. 8, the hub device 112 sends two discrete messages (812, 814) (e.g., two packets), whereas, in the case of FIG. 9, the hub device 112 sends a single integrated message 912 (e.g., a single packet) that includes both the identity-bearing message 910 and the input event message 908. In another implementation, the hub device 112 can produce a single integrated message in which the identity-bearing message 910 is encapsulated by the input event message 908.

In one case, the tagging component 906 produces an integrated message 912 even when the identity-bearing component 114 is removed from the hub device 112. In that case, the integrated message 912 includes a null-type identity-bearing message that indicates that no identity-bearing component 114 is currently coupled to the hub device 112. In another implementation, in this circumstance, the switching component 902 generates an input event message without an outer ID-bearing wrapper (e.g., without an identity-bearing message).

Now referring to the operating system 128, the driver management component 816 loads a custom hub driver 914 when it discovers the hub device 112. The custom hub driver 914 performs a de-capsulation function by extracting the input event message 908 from the identity-bearing message 910. The driver management component 816 loads a device driver 916 when it discovers the peripheral device 118.

The IEPC 520 maintains state information that determines whether the hub device 112 is currently coupled to an identity-bearing component. The IEPC 520 also monitors changes in the state information to provide change-of-state information, corresponding to instances of time at which the user X adds an identity-bearing component or removes an identity peripheral device.

In other words, for frame of reference, the hub device 112 in the implementation of FIG. 8 sends a discrete identity-bearing message whenever it detects a change in status of the hub device 112, with respect to whether or not it is connected to the identity-bearing component 114. The hub device 112 in the implementation of FIG. 9 sends an identity-bearing message whenever a peripheral device issues an input event message. Here, the IEPC 520 interprets the stream of identity-bearing messages to determine when any particular identity-bearing message in the stream conveys a change in the status of the hub device 112, with respect to its connection to the identity-bearing component 114.

The implementations of FIGS. 8 and 9 correspond to different ways of allocating the processing of identity-related events, and may have different respective merits in different use scenarios. The implementation of FIG. 9, for instance, involves more complex processing operations at the hub-level compared to the example of FIG. 9. These tagging operations performed by the hub device 112 may increase the cost of the hub device 112, but may also help reduce the processing burden placed on the operating system 128. On the other hand, the implementation of FIG. 8 may more readily accommodate the task of modifying an existing system to adopt the features of the system 102 shown in FIG. 1. For instance, the implementation of FIG. 8 may allow an existing USB hub driver to be reused as the hub driver 820; by contrast the custom hub driver 914 of FIG. 9 performs a custom de-capsulation function that is not handled by existing USB hub drivers.

B. Illustrative Processes

FIG. 10 shows a process 1002 that explains the operation of the system 102 of Section A in flowchart form. Since the principles underlying the operation of the system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 1004, the host computing device 104 receives an identity-bearing message 124 from the hub device 112. The identity-bearing message 124 indicates that an identity-bearing component 114 has been communicatively coupled to the hub device 112. The identity-bearing message 124 conveys user information 116 associated with a first user X, as provided by the identity-bearing component 114. Further assume that hub device 112 is also communicatively coupled to one or more peripheral devices (118, 120, . . . , 122) that provide input event information and/or provide output event information.

In block 1006, in response to the receiving operation in block 1004, the host computing device 104 provides access-related information in a data store 526 based on the user information that has been received. The access-related information indicates that the first user X is associated with all peripheral devices (118, 120, . . . , 122) coupled to the hub device 112. The access-related information also identifies authentication information associated with the first user X, for use in authenticating the first user.

In block 1008, the host computing device 104 governs interaction by the first user X with a target resource (such as the application 502), via any peripheral device coupled to the hub device 112, based on the access-related information.

In block 1010, the host computing device 104 receives another identity-bearing message from the hub device 112 that indicates that the identity-bearing component 114 has now been communicatively decoupled from the hub device 112.

In block 1012, the host computing device 104 updates the access-related information to indicate that the first user X is no longer associated with the hub device 112 and the peripheral devices (118, 120, . . . , 122) coupled thereto.

C. Representative Computing Functionality

Figure 11:
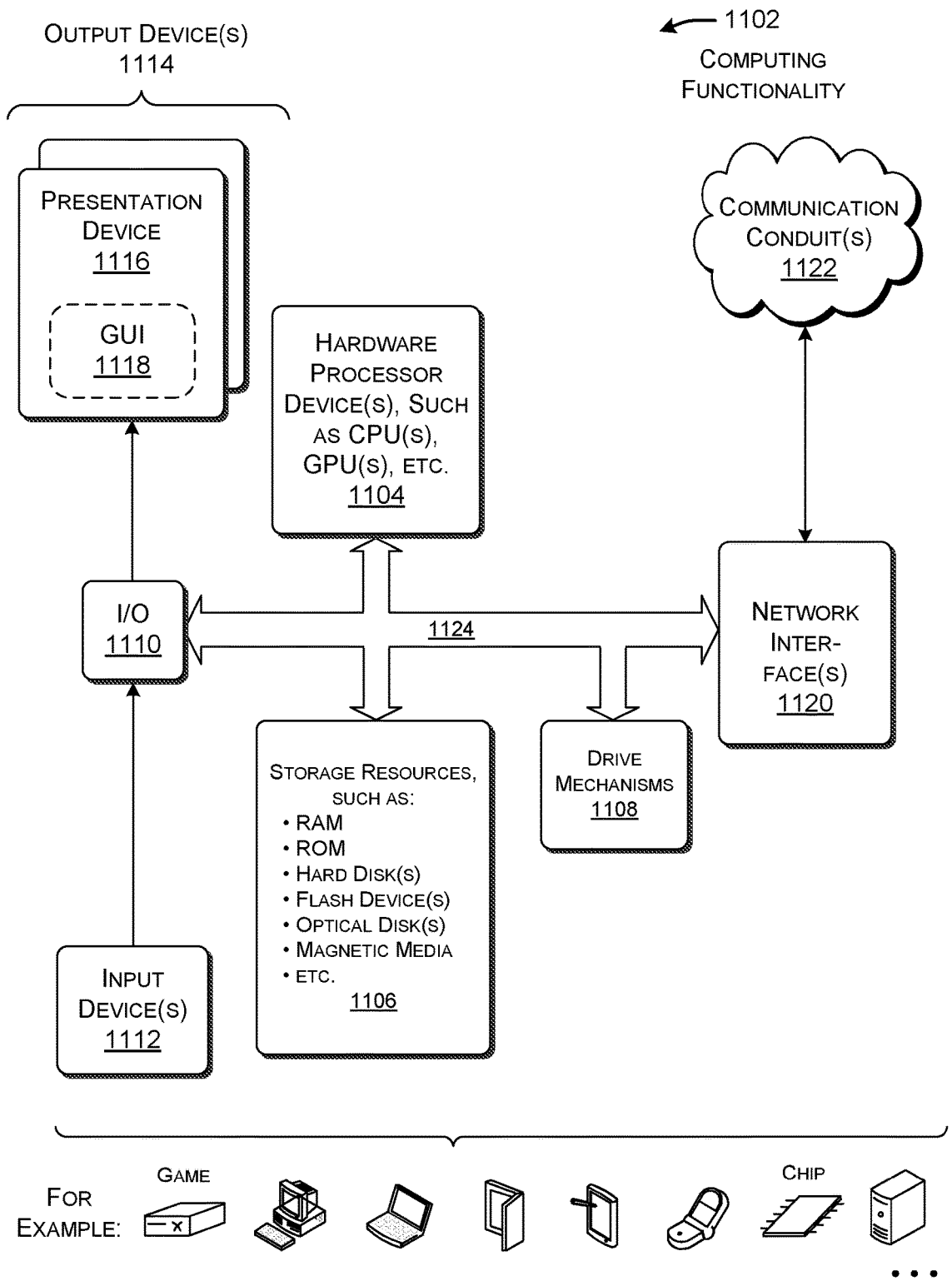
FIG. 11 shows illustrative computing functionality that can be used to implement any aspect of the features shown in the foregoing drawings.

FIG. 11 shows computing functionality 1102 that can be used to implement any aspect of the mechanisms set forth in the above-described figures. For instance, the type of computing functionality 1102 shown in FIG. 11 can be used to implement the host computing device 104 shown in FIG. 1. In all cases, the computing functionality 1102 represents one or more physical and tangible processing mechanisms.

The computing functionality 1102 can include one or more hardware processor devices 1104, such as one or more central processing units (CPUs), and/or one or more graphics processing units (GPUs), and so on. The computing functionality 1102 can also include any storage resources (also referred to as computer-readable storage media or computer-readable storage medium devices) 1106 for storing any kind of information, such as machine-readable instructions, settings, data, etc. Without limitation, for instance, the storage resources 1106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1102. The computing functionality 1102 may perform any of the functions described above when the hardware processor device(s) 1104 carry out computer-readable instructions stored in any storage resource or combination of storage resources. For instance, the computing functionality 1102 may carry out computer-readable instructions to perform each block of the process 1002 described in Section B. The computing functionality 1102 also includes one or more drive mechanisms 1108 for interacting with any storage resource, such as a hard disk drive mechanism, an optical disk drive mechanism, and so on.

The computing functionality 1102 also includes an input/output component 1110 for receiving various inputs (via input devices 1112), and for providing various outputs (via output devices 1114). Illustrative input devices include any kind of input peripheral device described in Section A. One particular output mechanism may include a display device 1116 and an associated graphical user interface presentation (GUI) 1118. The display device 1116 may correspond to a charge-coupled display device, a cathode ray tube device, a projection mechanism, etc. Other output devices include a printer, one or more speakers, a haptic output mechanism, a storage device (for storing output information), and so on. The computing functionality 1102 can also include one or more network interfaces 1120 for exchanging data with other devices via one or more communication conduits 1122. One or more communication buses 1124 communicatively couple the above-described components together.

The communication conduit(s) 1122 can be implemented in any manner, e.g., by a local area computer network, a wide area computer network (e.g., the Internet), point-to-point connections, etc., or any combination thereof. The communication conduit(s) 1122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1102 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described for interacting with one or more peripheral devices. The method includes receiving an identity-bearing message from a hub device. The identity-bearing message indicates that an identity-bearing component has been communicatively coupled to the hub device, wherein the identity-bearing message conveys user information associated with a first user, as provided by the identity-bearing component. The hub device is also communicatively coupled to one or more peripheral devices through which the first user receives input event information and/or provides output event information. The method also includes providing access-related information in a data store based on the user information, the access-related information indicating that the first user is associated with all peripheral devices coupled to the hub device, and the access-related information providing authentication information for use in authenticating the first user. The method also includes governing interaction by the first user with a target resource, via any peripheral device coupled to the hub device, based on the access-related information.

According to a second aspect, one of the peripheral devices coupled to the hub device is an input peripheral device. The method further includes receiving an input event message from the input peripheral device via the hub device, wherein the input event message conveys input event information pertaining to an input action that has been performed by the first user via the input peripheral device in a course of interacting with the target resource. The above-referenced governing operation includes processing the input event information in a manner that is based on the access-related information.

According to a third aspect, the processing referenced in the second aspect includes: tagging the input event information with an identifier associated with the user, to provide user-tagged input event information; and passing the user-tagged input event information to the target resource.

According to a fourth aspect, the input event information conveys a request by the first user to access the target resource. The processing referenced in the second aspect includes granting or denying the first user access to the target resource based on the access-related information.

According to a fifth aspect, the identity-bearing message and the input event message (referenced in the second aspect) are received together via an integrated packet.

According to a sixth aspect, identity-bearing message and the input event message (referenced in the second aspect) are alternatively received as two respective separate packets.

According to a seventh aspect, one of the peripheral devices coupled to the hub device is an output peripheral device. The method further includes receiving an output event message from the target resource that conveys output event information to be directed to the first user. The governing operation includes selectively sending the output event message to the output peripheral device, via the hub device, based on the access-related information, such that another user, besides the first user, who is also interacting with the target resource does not receive the output event message.

According to an eighth aspect, the method further includes: receiving another identity-bearing message from the hub device that indicates that the identity-bearing component has been communicatively decoupled from the hub device; and updating the access-related information to indicate that the first user is no longer associated with the hub device, and no longer associated with the peripheral device(s) coupled to the hub device.

According to a ninth aspect, the method further includes receiving another identity-bearing message from another hub device. The other identity-bearing message indicates that another identity-bearing component has been communicatively coupled to the other hub device. And the other identity-bearing message conveys user information associated with a second user, as provided by the other identity-bearing component. The other hub device is also communicatively coupled to one or more other peripheral devices. The method further includes providing additional access-related information in the data store based on the user information for the second user, the additional access-related information indicating that the second user is associated with all of the other peripheral devices coupled to the other hub device, and the access-related information providing authentication information for use in authenticating the second user. The method further includes governing interaction by the second user with the target resource, via any of the other peripheral device coupled to the other hub device, based on the access-related information.

According to a tenth aspect, the method further includes interacting with an anonymous hub device, wherein the anonymous hub device is not communicatively coupled to any identity-bearing component that provides user information, and hence, is not associated with any particular user.

According to an eleventh aspect, the hub device is an integrated part of an input peripheral device or an output peripheral device.

According to a twelfth aspect, a computing device is described for interacting with one or more peripheral devices. The computing device includes an identity event processing component configured to receive an identity-bearing message from a hub device. The identity-bearing message indicates that an identity-bearing component has been communicatively coupled to the hub device. The identity-bearing message also conveys user information associated with a first user, as provided by the identity-bearing component. The hub device is also communicatively coupled to one or more peripheral devices through which the first user receives input event information and/or provides output event information. The computing device also includes an access management component configured to provide access-related information in a data store based on the user information, the access-related information indicating that the first user is associated with all peripheral devices coupled to the hub device, and the access-related information providing authentication information for use in authenticating the first user. The computing device is configured to govern interaction by the first user with a target resource, via any peripheral device coupled to the hub device, based on the access-related information.

According to a thirteenth aspect, the computing device further includes a first collection of drivers for interacting with peripheral devices that are currently coupled to the hub device. The first collection of drivers is associated with the first user in accordance with the access-related information.

According to a fourteenth aspect, one of the peripheral devices coupled to the hub device is an input peripheral device. Further, a driver associated with the input peripheral device receives an input event message from the input peripheral device via the hub device. The input event message conveys input event information pertaining to an input action that has been performed by the first user via the input peripheral device in a course of interacting with the target resource. The computing device is configured to process the input event information in a manner that is based on the access-related information.

According to a fifteenth aspect, one of the peripheral devices coupled to the hub device is an output peripheral device. Further, a driver associated with the output peripheral device receives an output event message from the target resource that conveys output event information to be directed to the first user. The computing device is configured to selectively send the output event message to the output peripheral device, via the hub device, based on the access-related information, such that another user, besides the first user, who is also interacting with the target resource does not receive the output event message.

According to a sixteenth aspect, the computing device also includes a second collection of drivers for interacting with other peripheral devices that are currently coupled to another hub device. The other hub device, the other peripheral devices, and the second collection of drivers are associated with a second user in accordance with the access-related information.

According to a seventeenth aspect, the computing device further includes a third collection of drivers for interacting with other peripheral devices that are currently coupled to another hub device. The other hub device, the other peripheral devices, and the third collection of drivers are not associated with any particular user.

According to an eighteenth aspect, the hub device is an integrated part of an input peripheral device or an output peripheral device.

According to a nineteenth aspect, a system is described for interacting with one or more peripheral devices. The system includes a hub device, which, in turn, includes: a first port that is communicatively coupled to an identity-bearing component, the identity-bearing component providing user information associated with a first user; a second port that is communicatively coupled to a particular peripheral device through which the first user receives input event information and/or provides output event information. The system also includes a host computing device. The host computing device includes an identity event processing component and an access management component. The identity event processing component is configured to receive an identity-bearing message from the hub device, the identity-bearing message: (a) indicating that the identity-bearing component has been communicatively coupled to the hub device; and (b) conveying user information associated with a first user, as provided by the identity-bearing component. The access management component is configured to provide access-related information in a data store based on the user information, the access-related information indicating that the first user is associated with all peripheral devices coupled to the hub device, and the access-related information providing authentication information for use in authenticating the first user. The host computing device is configured to govern interaction by the first user with a target resource, via the particular peripheral device, based on the access-related information.

According to a twentieth aspect, the system includes another hub device that includes: a first port that is communicatively coupled to another identity-bearing component, the other identity-bearing component providing user information associated with a second user; and a second port that is communicative coupled to another peripheral device through which the second user receives input event information and/or provides output event information.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
receiving an initial identity-bearing message from a hub device, the initial identity-bearing message providing an initial indication that a physical or wireless communication coupling has been established between an identity-bearing component and the hub device, the initial identity-bearing message conveying user information associated with a first user, as received from the identity-bearing component via the hub device, and the hub device also being communicatively coupled to a plurality of peripheral devices other than the identity-bearing component;

responsive to receiving the initial identity-bearing message, establishing access-related information in a data store, the access-related information indicating that the first user is associated with the plurality of peripheral devices coupled to the hub device, and the access-related information providing authentication information for use in authenticating the first user; and based at least on the access-related information in the data store, governing interaction by the plurality of peripheral devices with a target resource.

2. The method of claim 1, wherein at least one of the plurality of peripheral devices coupled to the hub device is an input peripheral device, the method further comprising:

receiving an input event message from the input peripheral device via the hub device, wherein the input event message conveys input event information pertaining to an input action that has been performed via the input peripheral device in a course of interacting with the target resource, wherein said governing comprises processing the input event information based at least on the access-related information.

3. The method of claim 2, wherein the processing comprises:

tagging the input event information with an identifier associated with the first user, to provide user-tagged input event information; and passing the user-tagged input event information to the target resource.

4. The method of claim 2, wherein the input event information conveys a request to access the target resource, and wherein said processing comprises granting or denying access to the target resource based at least on the access-related information.

5. The method of claim 2, further comprising:

receiving another identity-bearing message and the input event message together via an integrated packet; and decapsulating the integrated packet to extract the input event message.

6. The method of claim 2, further comprising:

receiving another identity-bearing message and the input event message as two respective separate packets.

7. The method of claim 1, wherein at least one of the plurality of peripheral devices coupled to the hub device is an output peripheral device, the method further comprising:

receiving an output event message from the target resource that conveys output event information to be directed to the output peripheral device, wherein said governing comprises:

selectively sending the output event message to the output peripheral device, via the hub device, based at least on the access-related information; and not sending the output event message to another output peripheral device that is communicatively coupled to another hub device and that is also being used to interact with the target resource.

8. The method of claim 1, further comprising:

receiving another identity-bearing message from the hub device that indicates that the identity-bearing component has been communicatively decoupled from the hub device; and updating the access-related information to indicate that the first user is no longer associated with the hub device, and no longer associated with the plurality of peripheral devices coupled to the hub device.

9. The method of claim 1, further comprising:

receiving another initial identity-bearing message from another hub device, the another initial identity-bearing message providing another initial indication that another physical or wireless communication coupling has been established between another identity-bearing component and the another hub device, the another initial identity-bearing message conveying user information associated with a second user, as received from the another identity-bearing component via the another hub device, and the another hub device also being communicatively coupled to a plurality of other peripheral devices other than the another identity-bearing component;

responsive to receiving the another initial identity-bearing message, establishing additional access-related information in the data store based at least on the user information for the second user, the additional access-related information indicating that the second user is associated with the plurality of other peripheral devices coupled to the another hub device, and the additional access-related information providing additional authentication information for use in authenticating the second user; and based at least on the additional access-related information in the data store, governing interaction by the plurality of other peripheral devices with the target resource.

10. The method of claim 9, wherein the target resource comprises a multi-user application, the method further comprising:

receiving a first stream of first event messages from a first input peripheral device communicatively coupled to the hub device;

receiving a second stream of second event messages from a second input peripheral device communicatively coupled to the another hub device;

tagging the first event messages with first identification information identifying the first user to obtain tagged first event messages;

tagging the second event messages with second identification information identifying the second user to obtain tagged second event messages; and providing the tagged first event messages and the tagged second event messages to the multi-user application, wherein the multi-user application concurrently controls separate user-specific graphical elements based at least on the tagged first event messages and the tagged second event messages.

11. The method of claim 10, wherein the first input peripheral device is a first mouse, the second input peripheral device is a second mouse, the separate user-specific graphical elements include a first cursor controlled by the first mouse and a second cursor controlled by a second mouse, and the multi-user application is a collaborative application that concurrently displays the first cursor and the second cursor on a shared user interface presentation.

12. The method of claim 1, performed entirely by a host computing device that is communicatively coupled to the hub device.

13. A computing device, comprising:
a hardware processor; and
a storage resource storing machine-readable instructions which, when executed by the hardware processor, cause the hardware processor to:
receive an initial identity-bearing message from a hub device,
the initial identity-bearing message providing an initial indication that a physical or wireless communication coupling has been established between an identity-bearing component and the hub device,
the initial identity-bearing message conveying user information associated with a first user, as received from the identity-bearing component via the hub device, and
the hub device also being communicatively coupled to a plurality of peripheral devices other than the identity-bearing component;
responsive to receipt of the initial identity-bearing message, establish access-related information in a data store based at least on the user information, the access-related information indicating that the first user is associated with the plurality of peripheral devices coupled to the hub device, and the access-related information providing authentication information for use in authenticating the first user; and
based at least on the access-related information in the data store, govern interaction by the plurality of peripheral devices with a target resource.

14. The computing device of claim 13, wherein the machine-readable instructions, when executed by the hardware processor, cause the hardware processor to:
associate a first collection of drivers with the first user in accordance with the access-related information, wherein the drivers of the first collection are configured to interact with the plurality of peripheral devices coupled to the hub device.

15. The computing device of claim 13, wherein at least one of the plurality of peripheral devices coupled to the hub device is an input peripheral device, and wherein the machine-readable instructions, when executed by the hardware processor, cause the hardware processor to:
process input event information received from the input peripheral device based at least on the access-related information.

16. The computing device of claim 13, wherein at least one of the plurality of peripheral devices coupled to the hub device is an output peripheral device, and the machine-readable instructions, when executed by the hardware processor, cause the hardware processor to:
based at least on the access-related information, selectively send an output event message to the output peripheral device but not another output peripheral device in an instance when the another output peripheral device is interacting with the target resource, is associated with another user, and is communicatively coupled to another hub device.

17. The computing device of claim 13, wherein the target resource comprises an application and the interaction with the application is governed by an operating system of the computing device.

18. The computing device of claim 17, wherein the target resource comprises a multi-user or collaborative application, and the machine-readable instructions, when executed by the hardware processor, cause the hardware processor to:
establish other access related information in the data store indicating that a second user is associated with another plurality of peripheral devices that are communicatively coupled to another hub device; and
by the operating system:
tag first events received from the hub device with a first identification of the first user and tag second events received from the another hub device with a second identification of the second user; and
provide the tagged first events and the tagged second events to the multi-user or collaborative application.

19. The computing device of claim 18, wherein the machine-readable instructions, when executed by the hardware processor, cause the hardware processor to:
by the multi-user or collaborative application, control a shared user experience presented to the first user and the second user based at least on the tagged first events and the tagged second events.

20. A system comprising:
a hub device including:
a first port that is capable of communicatively coupling to an identity-bearing component; and
multiple other ports that are capable of communicatively coupling to a plurality of peripheral devices other than the identity-bearing component; and
a host computing device configured to:
receive an initial identity-bearing message from the hub device, the initial identity-bearing message: (a) providing an initial indication that the identity-bearing component has been communicatively coupled to the hub device; and (b) conveying user information associated with the first user, as received from the identity-bearing component via the hub device;
responsive to receipt of the initial identity-bearing message, establish access-related information based at least on the user information, the access-related information indicating that the first user is associated with the plurality of peripheral devices coupled to the hub device, and the access-related information providing authentication information for use in authenticating the first user; and
govern interaction by the plurality of peripheral devices with a target resource based at least on the access-related information.

21. The system of claim 20, wherein the hub device is configured to tag event messages received from the plurality of peripheral devices with an identifier of the first user.

* * * * *